(12) United States Patent
Sulzer et al.

(10) Patent No.: US 11,747,179 B2
(45) Date of Patent: Sep. 5, 2023

(54) MAGNETIC INDUCTIVE FLOW METER HAVING AN INSULATED ELECTRODE

(71) Applicant: Endress+Hauser Flowtec AG, Reinach (CH)

(72) Inventors: Thomas Sulzer, Basel (CH); Florent Tschambser, Hesingue (FR)

(73) Assignee: Endress+Hauser Flowtec AG, Reinach (CH)

( * ) Notice: Subject to any disclaimer, the term of this patent is extended or adjusted under 35 U.S.C. 154(b) by 1107 days.

(21) Appl. No.: 16/465,224

(22) PCT Filed: Oct. 11, 2017

(86) PCT No.: PCT/EP2017/075924
§ 371 (c)(1),
(2) Date: May 30, 2019

(87) PCT Pub. No.: WO2018/099640
PCT Pub. Date: Jun. 7, 2018

(65) Prior Publication Data
US 2020/0003592 A1    Jan. 2, 2020

(30) Foreign Application Priority Data
Nov. 30, 2016  (DE) ...................... 10 2016 123 123.1

(51) Int. Cl.
*G01F 1/58*      (2006.01)
*C08G 69/10*     (2006.01)
(Continued)

(52) U.S. Cl.
CPC ............. *G01F 1/584* (2013.01); *C08G 69/10* (2013.01); *C08G 69/14* (2013.01); *C09D 5/00* (2013.01);
(Continued)

(58) Field of Classification Search
None
See application file for complete search history.

(56) References Cited

U.S. PATENT DOCUMENTS 3,834,232 A * 9/1974 Gruner .................... G01F 1/584
                                                73/861.12
4,269,071 A * 5/1981 Wada ...................... G01F 1/584
                                                73/861.12
(Continued)

FOREIGN PATENT DOCUMENTS

CN    101600946 A    12/2009
CN    101995276 A     3/2011
(Continued)

*Primary Examiner* — Harshad R Patel
(74) *Attorney, Agent, or Firm* — Christopher R. Powers; Endress+Hauser (USA) Holding, Inc.

(57) ABSTRACT

A magnetically inductive flow meter having a measuring tube with a wall, which includes an electrically insulating surface of a first material, and an electrode having an electrode axis, wherein the electrode has at least one electrode end surface for tapping off a measuring signal, in particular a measuring voltage, in a measuring medium, and has an electrode shank extending through the measuring tube wall, wherein the electrode has a stop projecting from the electrode shank with a stop surface to limit the displaceability of the electrode relative to the wall along the electrode axis, wherein the electrode has an electrically insulating coating in a region of the electrode shank and in a region of the stop surface, wherein the material of the electrically insulating coating has a Shore hardness which is equal to or lower than that of the first material.

18 Claims, 3 Drawing Sheets

(51) Int. Cl.
*C08G 69/14* (2006.01)
*C09D 5/00* (2006.01)
*C09D 177/02* (2006.01)
*C09D 177/04* (2006.01)

(52) U.S. Cl.
CPC ......... *C09D 177/02* (2013.01); *C09D 177/04* (2013.01)

(56) References Cited

U.S. PATENT DOCUMENTS

| | | | | |
|---|---|---|---|---|
| 4,358,964 A | * | 11/1982 | Otsuka | G01F 1/58 73/861.12 |
| 4,388,834 A | * | 6/1983 | Schmoock | G01F 1/584 73/861.12 |
| 4,517,846 A | * | 5/1985 | Harrison | G01F 1/584 73/861.12 |
| 4,773,275 A | * | 9/1988 | Kalinoski | G01F 1/584 73/861.12 |
| 4,912,838 A | * | 4/1990 | Goto | G01F 1/584 29/854 |
| 5,062,305 A | * | 11/1991 | Hansen | G01F 1/584 73/861.12 |
| 5,269,191 A | * | 12/1993 | Wada | G01F 1/584 73/861.11 |
| 5,280,727 A | * | 1/1994 | Hafner | G01F 1/58 73/861.11 |
| 5,773,723 A | * | 6/1998 | Lewis | G01F 1/58 73/861.12 |
| 5,955,681 A | * | 9/1999 | Hafner | G01F 1/584 73/861.17 |
| 2006/0179931 A1 | * | 8/2006 | Schwiderski | G01F 1/584 73/152.35 |
| 2008/0148810 A1 | * | 6/2008 | Boehm | G01F 1/002 73/19.1 |
| 2010/0089171 A1 | * | 4/2010 | Voigt | G01F 1/584 73/861.12 |
| 2010/0192700 A1 | | 8/2010 | Iijima | |
| 2011/0041620 A1 | * | 2/2011 | Izumi | G01F 1/584 73/861.12 |
| 2012/0017698 A1 | * | 1/2012 | Neuburger | G01F 1/58 73/861.12 |
| 2016/0161308 A1 | * | 6/2016 | Schoohf | G01F 1/58 73/861.12 |
| 2018/0216978 A1 | * | 8/2018 | Dames | G01F 15/18 |
| 2018/0313481 A1 | * | 11/2018 | Roberts | G01F 15/185 |

FOREIGN PATENT DOCUMENTS

| | | |
|---|---|---|
| CN | 104879365 A | 9/2015 |
| DE | 102007005898 A1 | 8/2008 |
| EP | 0608793 A2 | 8/1994 |
| EP | 2290331 A1 | 3/2011 |
| JP | 09145434 A | 6/1997 |
| JP | 10221133 A | 8/1998 |
| WO | 2008092794 A1 | 8/2008 |

\* cited by examiner

MAGNETIC INDUCTIVE FLOW METER HAVING AN INSULATED ELECTRODE

CROSS-REFERENCE TO RELATED APPLICATIONS

The present application is related to and claims the priority benefit of German Patent Application No. 10 2016 123 123.1, filed on Nov. 30, 2016 and International Patent Application No. PCT/EP2017/075924 filed on Oct. 11, 2017, the entire contents of which are incorporated herein by reference.

TECHNICAL FIELD

The present invention relates to a magnetically inductive flow meter.

BACKGROUND

Magnetically inductive flow meters are used for measuring the flow of a measuring medium in a pipeline. An electrically insulating lining, what is known as a liner, is typically used within the measuring tube in these flow meters.

A magnetically inductive flow meter typically has measuring electrodes and an electrode for monitoring fill level, what is known as an electrophoretic deposition (EPD) electrode.

In many instances, electrodes are guided out through the tube wall of a measuring tube of the magnetically inductive flow meter, as a result of which an object results to particularly seal the opening of the measuring tube wall through which the respective electrode, the measuring electrode, or the EPD electrode is guided.

An additional challenge arises given the use of the flow meter in the food and/or drinking water sector. In this context, the sealant for sealing the opening should also be approved for use in the drinking water and/or food sector.

Furthermore, when selecting the sealant it must be taken into account that the sealant does no damage to the material of the measuring tube adjoining the electrode is not damaged when the electrode is introduced.

Thus, multiple criteria must be taken into account in designing the sealant. Often, compromises must thereby be accepted in the processing and shaping.

The generic DE 10 2007 005 898 A1 and WO 2008/092794 A1 each disclose a magnetically inductive flow meter having a measuring tube, a measuring electrode with an electrode head, and an electrode-fixing arrangement, wherein the measuring tube has an electrically insulating lining. Arranged between the electrically insulating lining and the electrode head is a sealing means (reference numeral 19) which is formed as a PTFE sealing ring.

The arrangement of the measuring electrode on the measuring tube and the sealing means of the aforementioned prior art have already been fundamentally proven to be very reliable; however, starting from the aforementioned prior art, it is the object of the present invention to achieve a further improvement in the sealing.

SUMMARY

This object is achieved by a magnetically inductive flow meter according to the present disclosure.

A magnetically inductive flow meter according to the invention comprises a measuring tube with a measuring tube wall which has an electrically insulating surface made of a first material. The measuring tube may comprise an electrically insulating material or a metallic support tube provided with an electrically insulating lining.

The flow meter has at least one first electrode with an electrode axis. The electrode may be a measuring electrode or an EPD electrode. In a particularly preferred embodiment variant, all electrodes of the flow meter in the measuring tube are formed like the electrode explained in detail below.

The electrode has at least one electrode end surface for tapping off a measuring signal, in particular a measuring voltage, in a measuring medium.

The electrode also has an electrode shank which extends through the measuring tube wall. For this purpose, an opening is preferably provided in the measuring tube wall. The electrode seat can be flat or conical, for example.

The electrode has a stop projecting from the electrode shank and having a stop surface which limits the ability of the electrode to be displaced relative to the measuring tube wall along the electrode axis.

The electrode has an electrically insulating coating at least in a region of the electrode shank and at least in a region of the stop surface.

The material of the electrically insulating [sic] thereby has a Shore hardness which is equal to or less than that of the first material which forms the electrically insulating surface of the measuring tube.

On the one hand, the coating enables an optimal sealing along the electrode shank, even into the opening of the measuring tube. Moreover, the electrically insulating material of the measuring tube is not damaged when the electrode is affixed.

Further advantageous embodiments of the invention are the subject matter of the dependent claims.

The measuring tube can advantageously have an impression for receiving the electrode.

It is advantageous if the coating completely covers the stop surface. This thereby reduces the tendency of peripheral staining and deposits.

The stop surface is advantageously part of an electrode head contacting the medium in the intended operation, as a result of which optimum sealing is achieved.

The measuring tube is advantageously designed as a metallic support tube and an electrically insulating lining. In the event of a plastic tube, a cross-sectional widening can take place at higher pressures. This typically does not occur in the event of a metallic support tube.

The electrode head can have the electrode end surface, wherein the electrode head is rounded in the region of the electrode end surface to optimize the measured value detection.

The electrically insulating coating may advantageously be formed as an epoxy resin-based coating, a silicone-based coating, or a polyamide-based coating. An epoxy resin-based coating approved for drinking water, or a polyamide-based coating approved for drinking water, is thereby particularly preferred. Very particularly preferred is a PA11- and/or PA12-based coating.

The first material of the measuring tube can advantageously be formed as an epoxy resin-based material, a ceramic material, or, preferably, a polyamide-based material, in particular a PA11- and/or PA12-based material.

The Shore hardness of the coating of the electrode is advantageously less than Shore D=75.

The electrode may advantageously be affixed to the measuring tube by a resilient fixture. A damage when the electrode is affixed is thereby additionally prevented, and a compensation for material expansions at larger temperature differences between the manufacturing temperatures of 10-30° C. and the operating temperatures is achieved.

The layer thickness of the coating can advantageously be more than 300 µm; in particular an advantageous average layer thickness of the coating can be between 320 and 1000 µm.

The stop surface can extend perpendicular to the electrode axis in a simple manner in terms of manufacturing technology.

As an alternative to the vertical arrangement, the stop surface can also extend radially with respect to the electrode axis, wherein the electrode is conical in the region of the stop surface.

The coating can be materially bonded to the first material of the measuring tube. This can take place via adhesion or fusion, for example. An additionally increased sealing integrity is thereby achieved.

In a simple manner in terms of manufacturing technology, the coating may be arranged as a single layer on the electrode.

The bonding of the coating to the electrode may especially advantageously be a hybrid bonding, which is characterized in that a chemical bond is formed between the metal and the coating. A detachment of the coating is thereby prevented, and the coating is more stable with regard to abrasion. A hybrid bonding can, for example, be achieved by activation of the metal surface of the electrode before application of the coating.

BRIEF DESCRIPTION OF THE DRAWING

The invention is described in detail below with reference to a plurality of embodiment variants. In Figures.

DETAILED DESCRIPTION

Magnetically inductive flow meters are used in many ways in process and automation technology for fluids having an electrical conductivity starting at approximately 5 µS/cm. Corresponding flow meters are, for example, sold by the Applicant in a wide variety of embodiments for various fields of application under the name PROMAG.

Figure 4:
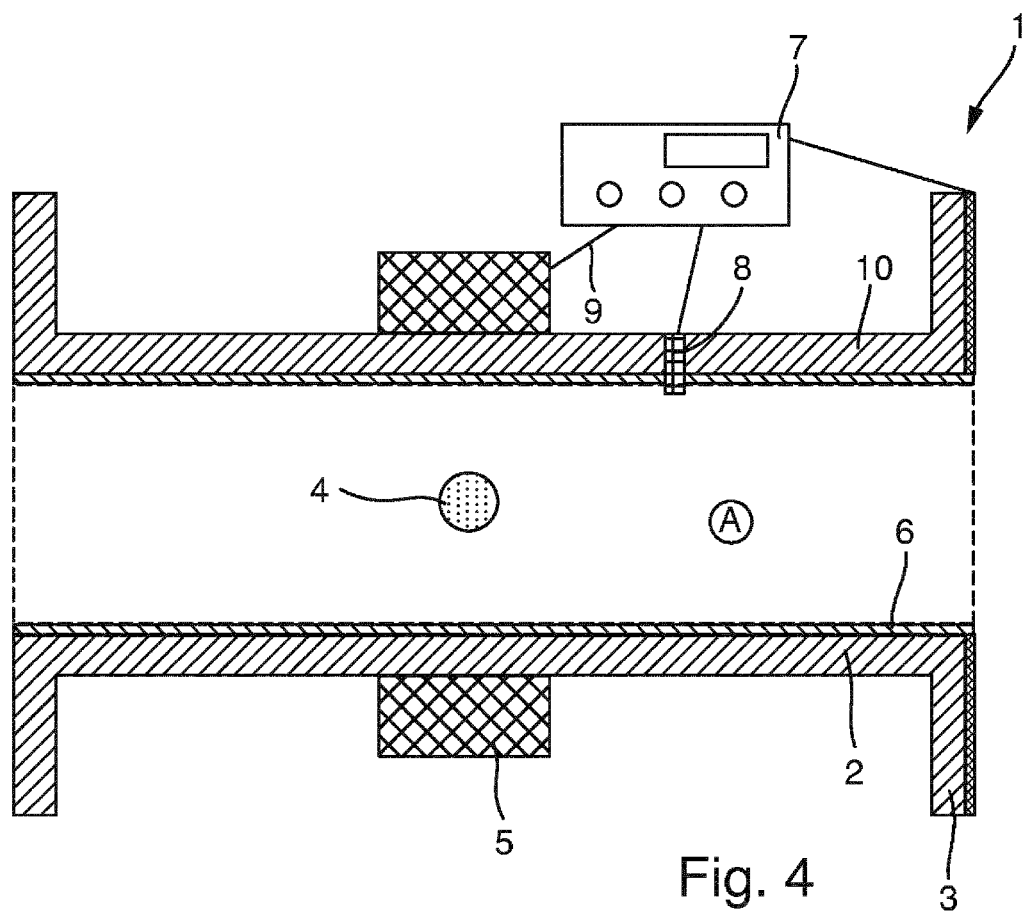
FIG. 4 schematically illustrates an exemplary embodiment of a magnetically inductive flow meter according to the present disclosure.

The measuring principle of a magnetically inductive flow meter 1 as depicted in FIG. 4 is known in principle. According to Faraday's Law of Induction, a voltage is induced in a conductor that moves within a magnetic field. In context of the magnetically inductive measuring principle, the flowing measuring substance or measuring medium corresponds to the moving conductor. A magnet system 5 for creating a magnetic field may be formed by two field coils diametrically arranged on a measuring tube 2, for example. Arranged orthogonally with respect thereto on the internal wall of the measuring tube 2 are two measuring electrodes 4 which tap off the voltage generated when the measuring substance flows through the tube. The voltage induced is in a proportional relation to the flow velocity and thus to the volume flow rate. The magnetic field created by the magnet system 5 can be created by a pulsed direct current with alternating polarity. This ensures a stable zero point and renders the measurement insensitive to influences from multiple phase substances, inhomogeneity in the liquid, or low conductivity. Magnetically inductive flow meters with coil arrangements having more than two magnet coils and a different geometric arrangement are known.

FIG. 4 shows a magnetically inductive flow meter 1 with the measuring tube 2 comprising a support tube 10, in particular a metallic support tube, and an electrically insulating plastic lining 6, what is known as the liner, arranged in the support tube 10.

The measuring tube 2 has two flanges 3 which make it possible to connect with a process connector. The outer wall of the measuring tube 2 has the magnet system 5 above and below the measuring tube axis, which magnet system is presented in FIG. 1 in the form of two magnet coils.

This magnet system generates a magnetic field during operation of the magnetically inductive flow meter. When installed horizontally at the same height as the measuring tube axis, the two measuring electrodes 4 are diametrically opposed to each other and tap off a voltage generated in the measuring medium during operation. If the volume flow rate is to be measured, it is particularly important that the filling of the measuring tube 2 be as complete as possible. Therefore, when installed horizontally at the highest point of the inner diameter of measuring tube 2, an electrode 8 of a filling level monitoring system, which in the present instance is designed as a measuring substance monitoring electrode, or EPD electrode for short, can be arranged on the measuring tube axis. This extends through the wall of the measuring tube 2, i.e. through the liner 6 and through the metallic wall of the support tube 10, and is attached to the side of the outer wall of the measuring tube 2 that faces away from the medium.

A temperature sensor in the form of a resistance thermometer can be arranged within the EPD electrode.

The measuring and evaluation device 7 enables the operation of the magnetically inductive flow meter 1, and in particular the power supply of the magnet system 5, to be controlled by a power supply system, and is connected to the magnet system via a power supply line and/or signal line 9.

Figure 1:
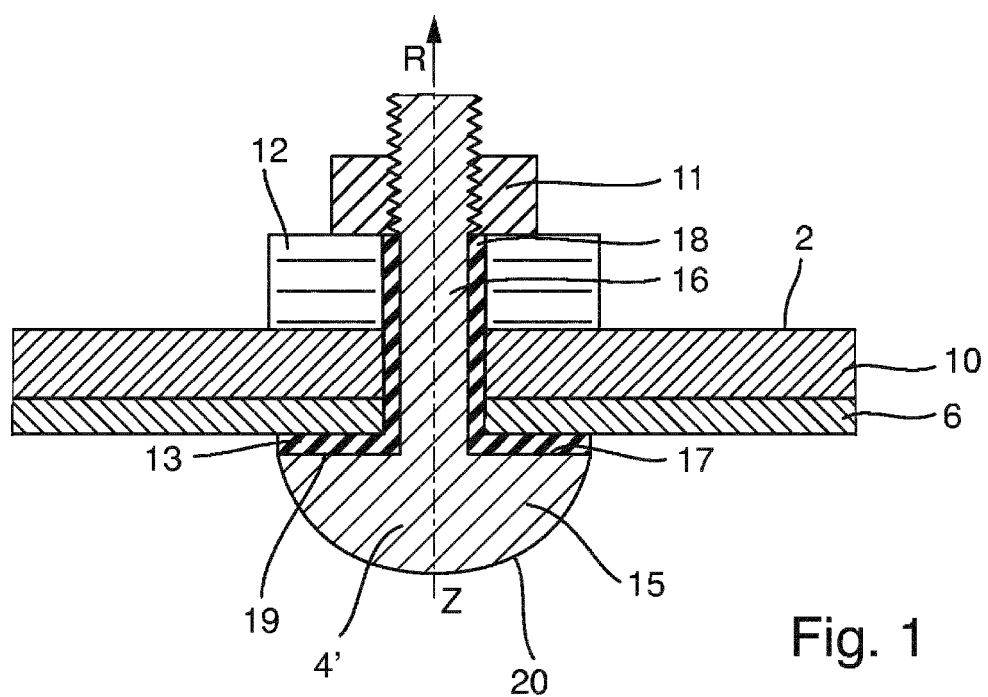
FIG. 1 schematically illustrates a first variant according to the present disclosure of an arrangement of an electrode on a measuring tube of a magnetically inductive flow meter.
Figure 2:
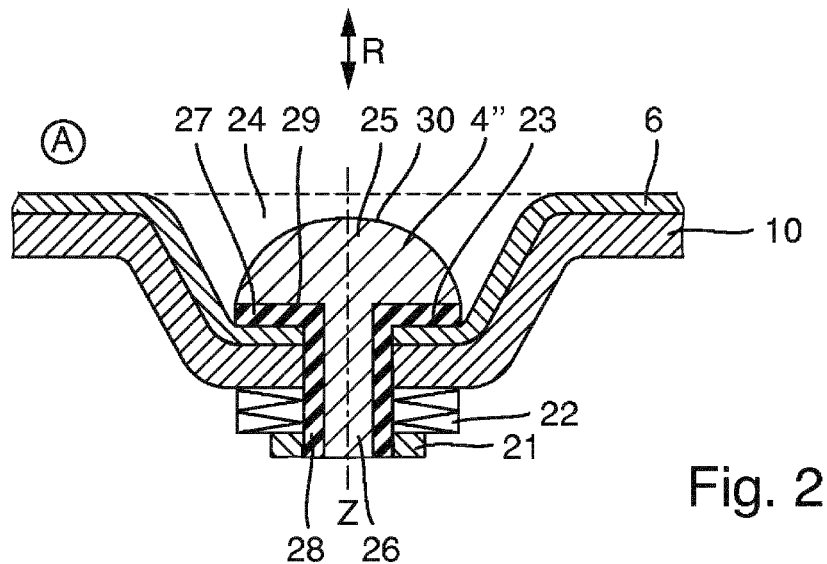
FIG. 2 schematically illustrates a second variant according to the present disclosure of an arrangement of an electrode on a measuring tube of a magnetically inductive flow meter.
Figure 3:
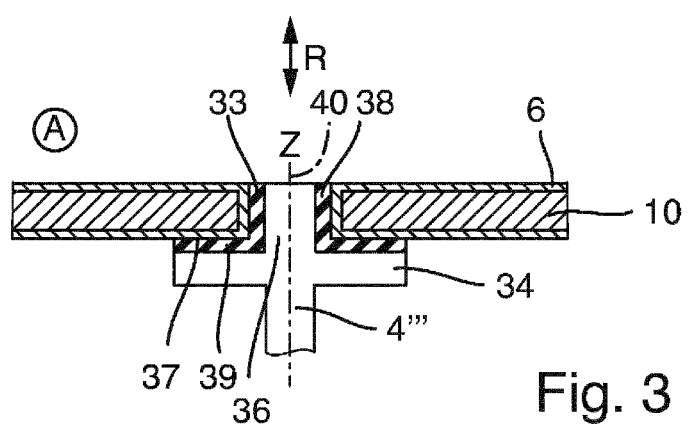
FIG. 3 schematically illustrates a third variant according to the present disclosure of an arrangement of an electrode on a measuring tube of a magnetically inductive flow meter.

FIGS. 1-3 show respective embodiment variants according to the invention which can be selected for anchoring the measuring electrodes 4, or also alternatively for anchoring the EPD electrode 8. Each of the variants of FIGS. 1-3 can thus be realized with the magnetically inductive flow meter of FIG. 4.

FIG. 1 shows an electrode 4' which has an electrode head 15 and an electrode shank 16. The electrode head 15 is designed as a mushroom head. Such a mushroom-head shape has an end surface 20 rounded at least at the edge, in particular a uniformly curved end surface. The end surface 20 projects into the interior A of the measuring tube 2.

The electrode 4' also has a stop surface 19 which limits the displaceability R of the electrode 4' along the electrode axis Z within the hole of the measuring tube wall.

The stop surface 19 is flat, with a surface plane that runs perpendicular to the electrode axis Z.

Arranged between the stop surface 19 and the electrically insulating material of the liner 6 that is associated with measuring tube 2 is a coating 13, which extends at least in regions over the stop surface 19 and over the surface of the electrode shank 16.

The coating 13 may thus be divided into a first sub-region 17 along the stop surface 19 and a second sub-region 18 along the electrode shank 16. The sub-regions 17 and 18 merge into one another, so that a coating 13 passing through both sub-regions 17 and 18 results.

The electrode 4' is affixed from the outside to the measuring tube 2 via a fixture. In the specific instance of FIG. 1, this fixation comprises a fixing means 11, for example for a screw fixing, and a fixation bearing 12, for example a bearing disk. The fixation bearing 12 is shown in FIG. 1 as a spring, in particular as a disk spring, so that a resilient fixation of the electrode 4' results.

The resilient fixation makes it possible to compensate for higher or lower temperatures, for example for a thermal material expansion.

Shown in FIG. 2 is an electrode 4" formed in the same way as in FIG. 1. This electrode 4" comprises a fixing means 21 and a fixation bearing 22 in the form of a disk spring. A resilient fixation is thereby achieved. The electrode has an end surface 30 contacting the medium in the intended operation and a stop face 29 which limits the mobility R of the electrode 4" relative to the measuring tube wall.

Analogous to FIG. 1, the measuring tube wall 2 has a metallic support tube 10 and an electrically insulating lining 6. In contrast to FIG. 1, the measuring tube has a deformation region in the form of an impression 24 for receiving the electrode 4". This is thus arranged in the deformation region formed radially out from the measuring tube wall. This has the advantage that the electrode 4" is not arranged directly in the flow of the measuring medium and does not represent a flow resistance.

The electrode 4" has an electrode head 25 and an electrode shank 26, as well as a coating 23 which extends along the stop face 29 arranged on the electrode head 25 and along the electrode shank 26. The coating 23 is thereby arranged in a region 27 along the stop surface 29 and in a region 28 along the electrode shank 26, wherein the regions 27 and 28 merge into one another. In the context of the present invention, the electrode head 25 is to be understood as a projection relative to the electrode shank 26.

The stop face 29 has a surface plane which extends perpendicular to the electrode axis Z. However, it is also possible that the electrode 4''' is conical in the region of the stop surface, e.g. frustum-shaped. The hole in the measuring tube wall is thereby not formed as a vertical hole, but rather has oblique walls corresponding to the conical shape of the stop face of the electrode 4'''.

FIG. 3 shows a further variant according to the invention, with an electrode 4''' and the anchorage thereof in the measuring tube, wherein the electrode 4''' is designed as what is known as a pin electrode. In contrast to the mushroom head electrode shown in FIGS. 1 and 2, such an electrode 4''' is inserted from the outside into the measuring tube so that the end surface 40 of the electrode 4''' that contacts the medium in the intended operation is aligned with the measuring tube wall 2.

The securing of the electrode 4''' to the measuring tube 2 is not shown in more detail but is known in principle. A pin electrode 4''' is typically used in flow meters with measuring tubes having small nominal widths, for example smaller than DN50.

Unlike in FIGS. 1 and 2, the measuring tube of FIG. 3 is formed from a metal support tube 10, wherein the electrically insulating lining 6 located therein also extends over the region of the support tube 10 that does not contact the medium. The lining can be applied in one step as a powder coating or as an immersion coating, for example in the context of what is known as a dip coating. Ideally, the material of the liner is approved for drinking water.

Alternatively, however, a ceramic tube or a plastic tube can also be used instead of the measuring tube made of a combination of support tube 10 and liner 6.

The pin electrode has a projection 34, in particular a plate-shaped projection, which, however, unlike the electrode head, is arranged not end-to-end on the electrode shank 36 but rather in a central region of the electrode shank 36.

A stop surface 39 of the projection 34 is arranged on the measuring tube from the outside and limits the displaceability R of the electrode 4''' along the electrode axis z relative to the measuring tube 2 and the opening located therein into which the electrode 4''' is inserted. The electrode 4''' has an electrically insulating coating 33 both in the region of the electrode shank 36, said region being located in the opening of the measuring tube, and in the region of the stop surface 39. The properties of the coating 33 are analogous to the coatings 13 and 23 of FIGS. 1 and 2. The coating 33 can thus be subdivided into a region 37 along the stop surface 39 and a region 38 along the electrode shank 36.

The electrodes 4', 4", 4''' are made of an electrically conductive material, preferably a corrosion-resistant metal, especially preferably steel, in particular a steel of grade 1.4435 and/or 1.4455. They are preferably rotationally symmetrical.

The electrodes 4', 4", 4''' shown in FIGS. 1-3 can be used both as measuring electrodes or as EPD electrodes.

The electrically insulating coating of the electrodes of FIGS. 1-3 can be embodied as an epoxy resin-based coating, as a silicone-based coating, or preferably as a polyamide-based coating, in particular a PA11- and/or PA12-based coating.

An epoxy resin-, silicone-, or polyamide-based coating means that at least 50 wt. %, preferably at least 80 wt. % of the respective polymer is contained in the coating. The polymer is thus the main component of the coating 13, 23, or 33.

A PA11/12 polyamide which is known under the trade name Rilsan is particularly preferred as the polyamide.

The measuring tube can be embodied as a ceramic tube, a plastic tube, or as a metal tube with an electrically insulating lining. In particular, the lining can thereby also be based on an epoxy resin or on a polyamide, preferably on a PA11 and/or PA12, in particular on Rilsan.

The Shore hardness of the coating should be less than or equal to the Shore hardness of the entire measuring tube in the event of a plastic tube or of a ceramic tube, or of the lining in the event of a metallic support tube.

Specifically, a Shore hardness of Shore D less than or equal to 75 is recommended for the coating 13, 23, 33.

The average layer thickness of the coating 13, 23, 33 may advantageously be greater than 300 μm in order to achieve an electrical insulation. An advantageous average layer thickness of the coating is particularly preferably between 320 and 1000 μm.

The layer thickness of the coating 13, 23, 33 preferably and advantageously has a uniform layer thickness distribution both in the region of the stop surface and in the region of the electrode shank. A uniform layer thickness varies by less than 15%, preferably by less than 10%, between the maximum or minimum and the average layer thickness.

The coating 13, 23, 33 can be materially bonded to the first material of the measuring tube. A material bond can be achieved by an adhesive or by fusion bonding. For example, the latter can be achieved by a laser treatment.

A series of functional coatings are formed in multiple layers. The present coating 13, 23, 33 can be arranged as a single-layer coating on the electrode in a manner that is cost-effective and efficient in terms of manufacturing technology.

The invention claimed is:

1. A magnetically inductive flow meter, the flow meter comprising:
 a measuring tube including a measuring tube wall, which includes an electrically insulating surface made of a first material; and
 an electrode including an electrode end surface configured for tapping off a measuring signal in a measuring medium and an electrode shank, which extends through an opening in the measuring tube wall along an electrode axis, wherein the electrode includes a stop that projects from the electrode shank, the stop including a stop surface structured to limit the displaceability of the electrode along the electrode axis and relative to the measuring tube wall,
 wherein the electrode includes an electrically insulating coating on at least that portion of the electrode shank which is disposed within the opening in the measuring tube wall and on at least a portion of the stop surface, and wherein the material of the coating has a Shore hardness that is lower than the Shore hardness of the first material.

2. The flow meter of claim 1, wherein the measuring signal is a measurement voltage.

3. The flow meter of claim 1, wherein the measuring tube has an impression for receiving the electrode.

4. The flow meter of claim 1, wherein the coating completely covers the stop surface.

5. The flow meter of claim 1, wherein the stop surface is a part of a medium-contacting electrode head of the electrode.

6. The flow meter of claim 5, wherein the electrode head includes the electrode end surface, wherein the electrode head is rounded in a region of the electrode end surface.

7. The flow meter of claim 1, wherein the measuring tube wall includes a metallic support tube and the electrically insulating surface includes an electrically insulating lining.

8. The flow meter of claim 1, wherein the coating is an epoxy resin-based coating, a silicone-based coating, or a polyamide-based coating.

9. The flow meter of claim 1, wherein the coating is a polyamide-based coating, including a PA11 and/or PA12 based coating.

10. The flow meter of claim 1, wherein the first material of the measuring tube is an epoxy resin-based material, a ceramic material, or a polyamide-based material.

11. The flow meter of claim 1, wherein the first material of the measuring tube is a polyamide-based material, including a PA11-based and/or PA12-based material.

12. The flow meter of claim 1, wherein the Shore hardness of the coating is less than 75 Shore D.

13. The flow meter of claim 1, wherein the electrode is fixed to the measuring tube by a resilient fixture.

14. The flow meter of claim 1, wherein the coating has a thickness greater than 300 μm.

15. The flow meter of claim 1, wherein the stop surface extends perpendicular to the electrode axis.

16. The flow meter of claim 1, wherein the stop surface extends radially with respect to the electrode axis, wherein the electrode has a conical form in a region of the stop surface.

17. The flow meter of claim 1, wherein the coating is materially connected to the first material of the measuring tube.

18. The flow meter of claim 1, wherein the coating is disposed as a single layer on the electrode.

* * * * *